United States Patent
Tang et al.

(10) Patent No.: US 11,923,559 B2
(45) Date of Patent: *Mar. 5, 2024

(54) BATTERY ASSEMBLY, BATTERY PACK AND VEHICLE

(71) Applicant: Contemporary Amperex Technology Co., Limited, Ningde (CN)

(72) Inventors: Yu Tang, Ningde (CN); Yanbo Chen, Ningde (CN); Peng Wang, Ningde (CN); Kaijie You, Ningde (CN); Xingdi Chen, Ningde (CN); Yongguang Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,434

(22) Filed: Jun. 29, 2022

(65) Prior Publication Data

US 2022/0336920 A1    Oct. 20, 2022

Related U.S. Application Data

(63) Continuation of application No. 16/856,796, filed on Apr. 23, 2020, now Pat. No. 11,417,932.

(30) Foreign Application Priority Data

Jul. 26, 2019   (CN) .......................... 201921187693.4

(51) Int. Cl.
*H01M 50/383*    (2021.01)
*H01M 50/209*    (2021.01)
(Continued)

(52) U.S. Cl.
CPC ....... *H01M 50/383* (2021.01); *H01M 50/209* (2021.01); *H01M 50/233* (2021.01);
(Continued)

(58) Field of Classification Search
CPC .... H01M 50/20; H01M 50/52; H01M 50/383; H01M 50/249; H01M 50/502
See application file for complete search history.

(56) References Cited

U.S. PATENT DOCUMENTS 9,450,219 B2   9/2016   Kim
9,553,289 B2   1/2017   Lee et al.
(Continued)

FOREIGN PATENT DOCUMENTS

CN    104347833 A    2/2015
CN    205985150 U    2/2017
(Continued)

OTHER PUBLICATIONS

International Search Report issue in International Application No. PCT/CN2020/104635, dated Oct. 30, 2020, 4 pages.
(Continued)

*Primary Examiner* — Kenneth J Douyette
(74) *Attorney, Agent, or Firm* — Sterne, Kessler, Goldstein & Fox P.L.L.C.

(57) ABSTRACT

A battery assembly includes a protection member and a battery module including at least two batteries arranged side by side along a first direction and having a first outer surface and a second outer surface opposite to each other along a second direction. The protection member is in the form of a letter U with two vertical portions having different lengths, wherein a first protection section covers the end covers of batteries in the battery module, a part of a second protection section covers the first outer surface, and a third protection section abuts against an end cover of a battery corresponding to the second outer surface. The protection member can prevent the airflow, the flame and the like sprayed during thermal runaway, and control a thermal diffusion range during thermal runaway.

16 Claims, 4 Drawing Sheets

(51) Int. Cl.
*H01M 50/233* (2021.01)
*H01M 50/249* (2021.01)
*H01M 50/276* (2021.01)
*H01M 50/30* (2021.01)
*H01M 50/502* (2021.01)
*H01M 50/505* (2021.01)

(52) U.S. Cl.
CPC ....... *H01M 50/249* (2021.01); *H01M 50/276* (2021.01); *H01M 50/30* (2021.01); *H01M 50/394* (2021.01); *H01M 50/502* (2021.01); *H01M 50/505* (2021.01); *H01M 2220/20* (2013.01)

(56) References Cited

U.S. PATENT DOCUMENTS

| | | | |
|---|---|---|---|
| 10,305,076 | B2 | 5/2019 | Sugawara |
| 2011/0151311 | A1 | 6/2011 | Lee et al. |
| 2020/0194819 | A1 | 6/2020 | Aikata et al. |
| 2021/0028426 | A1 | 1/2021 | Tang et al. |

FOREIGN PATENT DOCUMENTS

| | | |
|---|---|---|
| CN | 106663758 A | 5/2017 |
| CN | 207409556 U | 5/2018 |
| CN | 208797082 U | 4/2019 |
| CN | 209071469 U | 7/2019 |
| CN | 210092179 U | 2/2020 |
| IN | 103000836 A | 3/2013 |
| WO | 2013/001585 A1 | 1/2013 |
| WO | 2014/065110 A1 | 5/2014 |
| WO | 2018/234207 A1 | 12/2018 |
| WO | 2019/065169 A1 | 4/2019 |

OTHER PUBLICATIONS

Extended European Search Report issued in European Application No. 20166715.1, dated Jan. 21, 2021, 7 pages.
Machine Translation of: CN 207 409556U, Chen et al., May 25, 2018.

BATTERY ASSEMBLY, BATTERY PACK AND VEHICLE

CROSS REFERENCE TO RELATED APPLICATIONS

This application is a continuation of U.S. patent application Ser. No. 16/856,796 filed Apr. 23, 2020, now U.S. Pat. No. 11,417,932, which claims the benefit of priority to Chinese Application No. 201921187693.4 filed Jul. 26, 2019, both of which are herein incorporated by reference in their entireties.

TECHNICAL FIELD

The present disclosure relates to the technical field of a battery, in particular to a battery module, a battery pack and a vehicle.

BACKGROUND ART

In order to reduce the environmental pollution by gasoline and the like, batteries are widely applied in vehicles to provide electric drive for vehicles. In this case, the safety issue of the battery becomes more and more important, especially how to reduce the harm caused to the passengers in the vehicle during thermal runaway of the battery is of prime importance.

In order to satisfy the high power requirement of the vehicle, a battery pack is generally used as a power source for the vehicle. The battery pack is generally disposed on a vehicle body of the vehicle, and includes a battery module including a plurality of batteries arranged in an array. In the related art, during thermal runaway of the battery, the hot airflow, the flame and the like released by the battery are sprayed upward, thus directly threatening the safety of the passengers.

SUMMARY OF THE INVENTION

One technical problem to be solved by the present disclosure is: to improve the use safety of the battery.

In order to solve the above-mentioned technical problem, a first aspect of the present disclosure provides a battery module, comprising:
  a battery module, comprising a battery array, which comprises at least two batteries arranged side by side along a first direction, wherein a vent is provided on an end cover of the battery, the end covers a of all the batteries in the battery module have the same orientation, and the battery module has a first outer surface and a second outer surface opposite to each other along a second direction that is perpendicular to the first direction; and
  a protection member, being configured to protect against a flame sprayed via the vent, and comprising a first protection section, a second protection section, and a third protection section, wherein the second protection section and the third protection section are respectively connected to two opposite ends of the first protection section along the second direction, and the second protection section and the third protection section are both bent in a direction closer to the battery module relative to the first protection section;
  wherein the first protection section covers all the vents of batteries in the battery assembly, a part of the second protection section is covered on the first outer surface, and the third protection section abuts against the end cover of the battery corresponding to the second outer surface.

In some embodiments, the first protection section comprises a first portion and a second portion connected to the first portion, the first portion a is connected to the second protection section, the second portion is connected to the third protection section, and the first portion and the second portion are separated and at least partially overlapped in a third direction that is perpendicular to the first direction and the second direction.

In some embodiments, the first portion is located at one side of the second portion close the battery module.

In some embodiments, the first portion and the second protection section are integrated; and/or the second portion and the third protection section are integrated.

In some embodiments, the second protection section has a length greater than that of the third protection section.

In some embodiments, along the second direction, an outer surface of the third protection section is flush with the second outer surface, or an outer surface of the third protection section is close to the first outer surface relative to the second outer surface.

In some embodiments, the second direction is a vertical direction.

In some embodiments, the battery assembly further comprises a support member, wherein the support member is disposed on the first protection section and extends in a direction closer to the battery module.

In some embodiments, the battery module further comprises a bus bar, the bus bar is electrically connected to the batteries in the battery array, and the support member is located between the bus bar and the first protection section.

In some embodiments, the second protection section is adhered to the first outer surface.

In some embodiments, the protection member is a mica plate.

In some embodiments, the battery module comprises at least two battery arrays, which are stacked along the second direction.

In some embodiments, the battery module comprises two end plates, which are respectively disposed on both ends of the battery array along the first direction, and the protection member is connected to the end plate.

In some embodiments, the end plate comprises a base portion and a connection portion disposed on the base portion, the base portion is connected to the battery array, the connection portion is connected to the protection member, and there is a gap between one end of the base portion close to the protection member and the protection member.

A second aspect of the present disclosure further provides a battery pack, comprising an accommodating member having a chamber inside, and the battery assembly of the present disclosure, wherein the battery assembly is accommodated in the chamber.

In some embodiments, the battery pack comprises at least one pair of the battery modules, wherein two battery modules in the one pair of battery modules are arranged side by side along a third direction, end covers of two battery modules in the one pair of battery modules face away from each other, and the third direction is perpendicular to the first direction and the second direction.

A third aspect of the present disclosure further provides a vehicle, comprising a vehicle body, and further comprising a battery pack of the present disclosure, wherein the battery pack is disposed on the vehicle body, and the second direction is a height direction of the vehicle body.

In the protection member provided by the present disclosure, the second protection section and the third protection section are respectively connected to two opposite ends of the first protection section along the second direction, and are both bent in a direction closer to the battery module relative to the first protection section, the first protection section covers all the vents of batteries in the battery assembly, a portion of the second protection section is covered on the first outer surface, and the third protection section abuts against the end cover of the battery of the battery module corresponding to the second outer surface opposite to the first outer surface, thus the protection member preventing the airflow, the flame and the like sprayed during thermal runaway, and controlling a thermal diffusion range during thermal runaway, so that the use safety of the battery assembly is effectively improved.

Other features of the present disclosure and advantages thereof will become explicit by means of the following detailed descriptions of exemplary embodiments in the present disclosure with reference to the drawings.

BRIEF DESCRIPTION OF THE DRAWINGS

In order to more clearly illustrate the technical solutions in the embodiments of the present disclosure or in the related art, the drawings to be used in the embodiments or the related art will be briefly described below. Obviously, the drawings in the following description are only some embodiments of the present disclosure. For those skilled in the art, other drawings may be obtained according to these drawings without any creative labor.

DETAILED DESCRIPTION OF THE EMBODIMENTS

The technical solution of the embodiments in the present disclosure will be clearly and fully described in combination with the drawings of the embodiments in the present disclosure. Apparently, the described embodiments are merely a part of, not all of the embodiments in the present disclosure. The following descriptions of at least one exemplary embodiment are in fact merely illustrative, and in no way serve as any limitation on the present disclosure as well as its application or use. Based on the embodiments of the present disclosure, all the other embodiments obtained by those skilled in the art on the premise that no inventive effort is involved fall into the protection scope of the present disclosure.

The techniques, methods, and apparatuses known to a common technical person in the relevant art may not be discussed in detail, but where appropriate, the techniques, methods, and apparatuses should be considered as part of the granted specification.

In the description of the present disclosure, it is to be understood that, such words as "first" and "second" which are used to define the components, are only intended to facilitate the distinction between the corresponding components. Unless otherwise specified, the aforementioned words do not have particular meanings, and thus cannot be understood as a limitation to the protection scope of the present disclosure.

Further, the technical features involved in different embodiments of the present disclosure described below may be combined with each other as long as they do not constitute a conflict with each other.

FIGS. 1-7 illustrate a battery pack and a battery module thereof according to one embodiment of the present disclosure.

In this embodiment, the battery pack 100 serving as a power apparatus of a vehicle is disposed on a vehicle body to provide electric power to the vehicle. The vehicle may include an electric automobile or a hybrid vehicle and the like.

Figure 1:
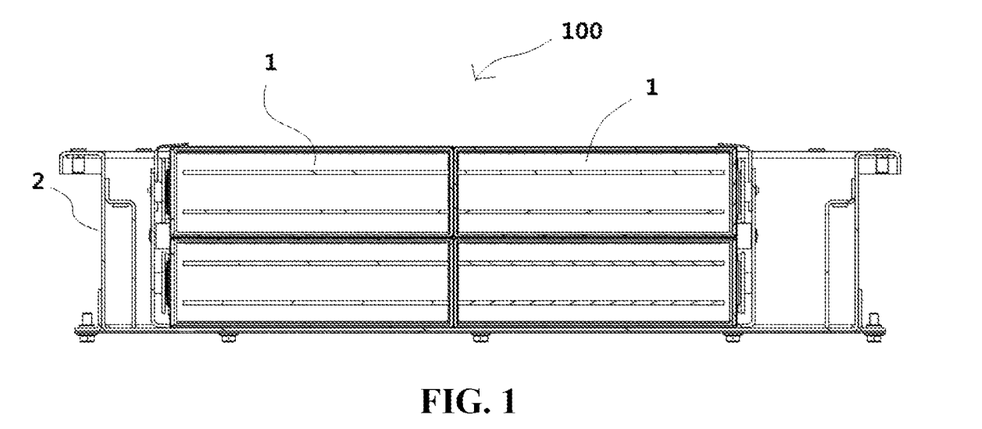
FIG. 1 shows a schematic sectional view of the battery pack according to one embodiment of the present disclosure.

As shown in FIG. 1, the battery pack 100 of this embodiment includes an accommodating member 2 and a pair of battery assemblies 1 which are both disposed in the accommodating member 2.

Figure 2:
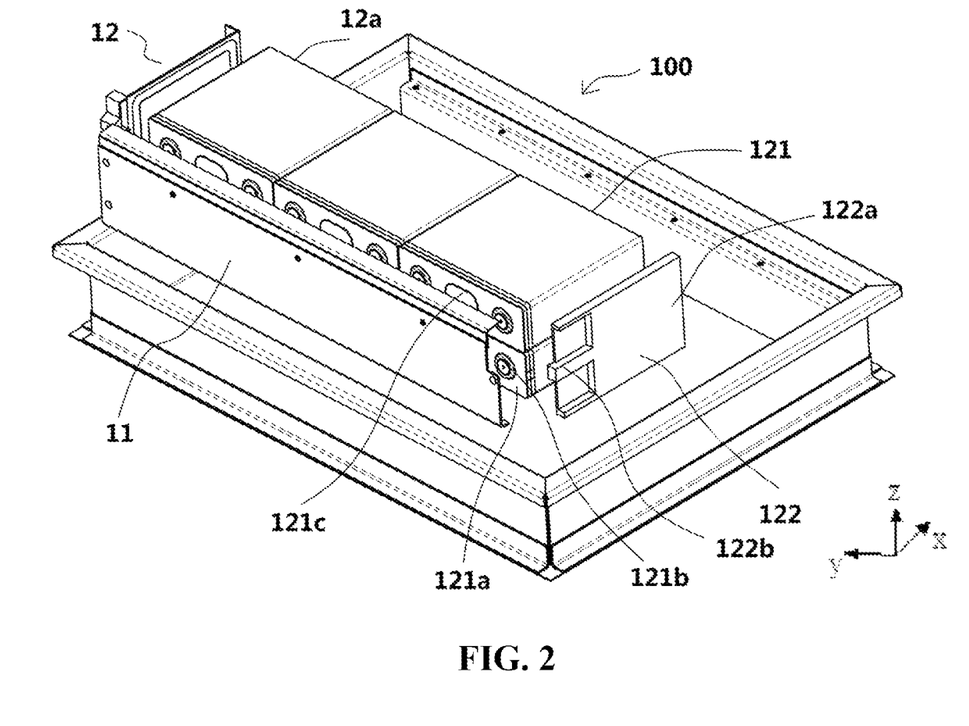
FIG. 2 shows a schematic exploded view of a partial structure of the battery pack shown in FIG. 1.
Figure 3:
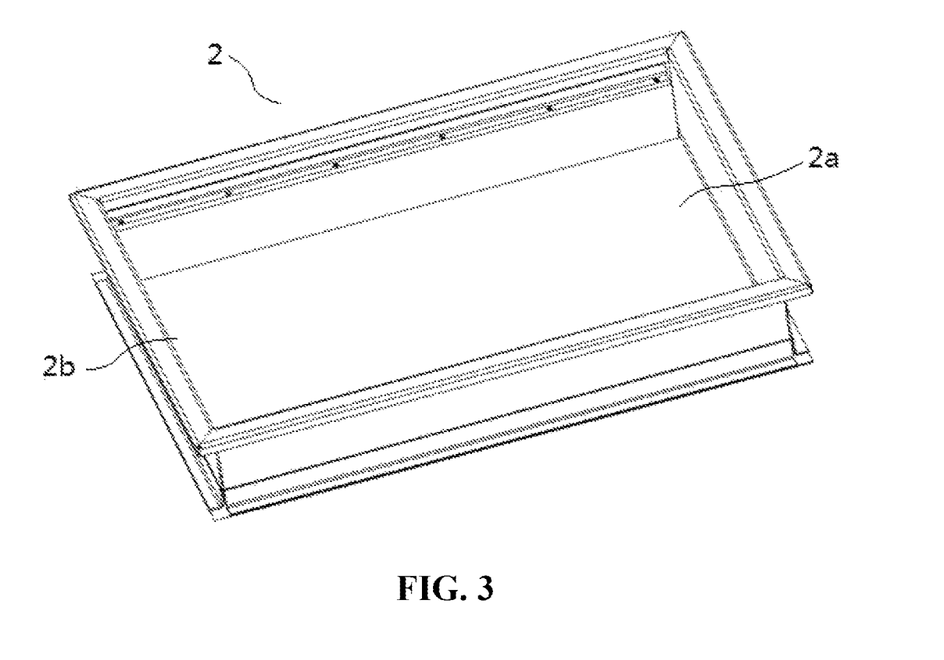
FIG. 3 shows a schematic perspective view of the accommodating member in FIG. 2.

The accommodating member 2 is configured to accommodate the battery assembly 1, so as to protect the internal battery assembly 1. As shown in FIGS. 2 and 3, in this embodiment, the accommodating member 2 is of a hollow cuboid shape, which is internally provided with a chamber 2a for accommodating the battery assembly 1, and an opening 2b is provided at one end of the chamber 2a to facilitate placing or removing the battery assembly 1. In other embodiments, the accommodating member 2 may also be in a shape other than a cuboid.

When provided on the vehicle body, the accommodating member 2 is vertically arranged, and the end with the opening 2b is arranged as a top end. At this time, the opening 2b faces upwards. In this case, the opening 2b faces towards passengers in the vehicle. After the battery assembly 1 is placed into the accommodating member 2, a cover may be provided at the opening 2b to close the chamber 2a. The cover and the accommodating member 2 may be sealed therebetween to provide a sealed space for the battery assembly 1 in the chamber 2a.

The battery assembly 1, which is disposed in the chamber 2a, is a core part of the battery pack 100 for providing electric power to the vehicle. The structures of the two battery assemblies 1 may be different, however, in order to simplify the structures, battery assemblies 1 are configured to have the same structure in this embodiment, and therefore, only one of them will be described below as an example.

For ease of description, a Cartesian coordinate system is shown in FIG. 2 to distinguish respective directions, wherein the coordinate axis y is used to represent a first direction, which refers to an arrangement direction of each battery 121 in the battery array 12a; the coordinate axis z is used to represent a second direction; the coordinate axis x is used to represent a third direction that is perpendicular to the first direction y and the second direction z.

Moreover, in the arrangement of this embodiment, the first direction y is parallel to the end cover 121a of the battery 121, which is a first horizontal direction, and at the same time is also a length direction of the battery pack 100;

the second direction z is along a vertical direction (also referred as a height direction of the vehicle body), and at the same time is also a height direction of the battery pack 100; and the third direction x is perpendicular to the end cover 121a, which is a second horizontal direction, and at the same time is also a width direction of the battery pack 100. It should be understood that, the term "parallel" not only includes an absolutely parallel case, but also includes substantially parallel cases of conventional cognition in engineering; at the same time, "vertical" also not only includes an absolutely vertical case, but also includes substantially vertical circumstances of conventional cognition in engineering. In addition, the orientation terms such as "up", "down", "top", "bottom" and the like described in the present disclosure are defined relative to the vertical direction, wherein "up" is a direction opposite to the gravity.

Figure 5:
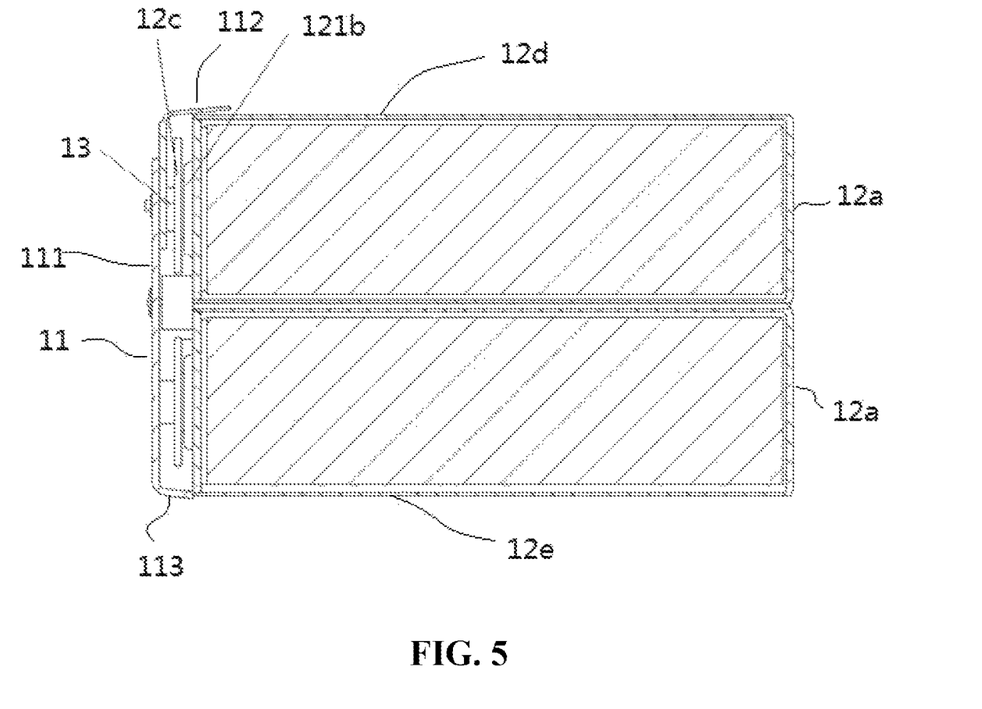
FIG. 5 shows a schematic view of a coordinating structure of the battery module, the protection member and the like in FIG. 4.

As can be seen from FIGS. 1, 2 and 5, in the embodiment, the battery assembly 1 includes a battery module 12, a protection member 11, a support member 13, and the like.

Figure 4:
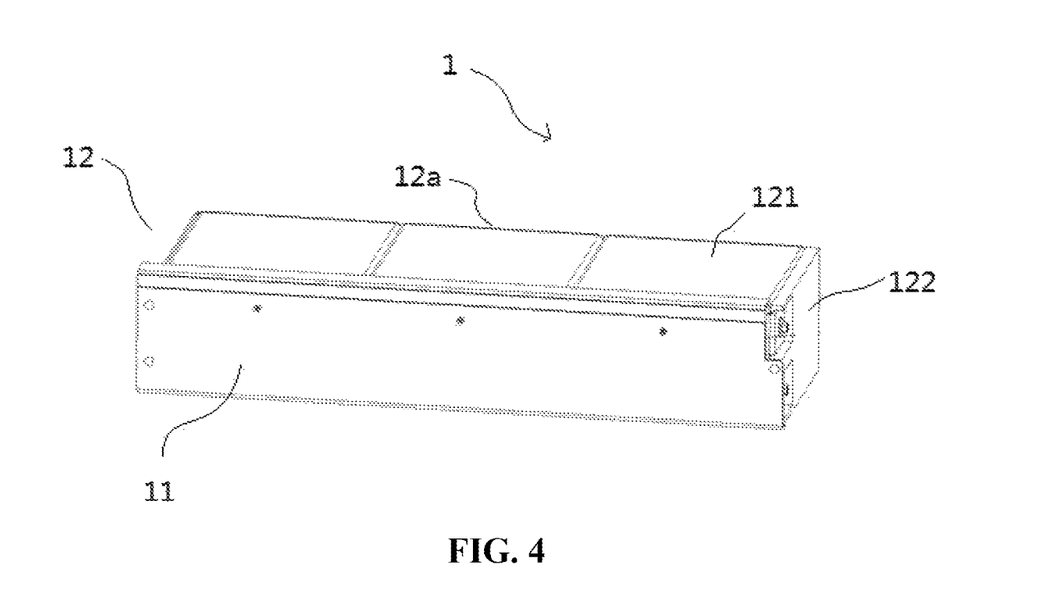
FIG. 4 shows a schematic perspective view of the battery assembly in FIG. 2.

Wherein, the battery module 12 is configured to generate and output electrical energy. As shown in FIGS. 2, 4 and 5, the battery module 12 includes a battery array 12a, an end plate 122, a bus bar 12c, and the like.

The battery module 12 may include one battery array 12a, or at least two battery arrays 12a, and the battery array 12a may include at least two batteries 121 arranged side by side along the first direction y. In this embodiment, it is exemplified that there are two battery arrays 12a in the battery module 12, and there are multiple batteries 121 in the battery array 12a, which, however, does not constitute a particular restriction on the number of the battery arrays 12a and the number of the batteries 121 in the battery array 12a.

As shown in FIG. 5, the battery 121 has an end cover 121a. The end cover 121a is provided with an electrode terminal 121b, a vent 121c, and the like. Generally, the end cover 121a is provided with two electrode terminals 121b, and the two electrode terminals 121b are respectively served as a positive electrode terminal and a negative electrode terminal, for electrically connecting to the positive and negative tabs of the battery 121 respectively. The vent 121c is generally disposed between the two electrode terminals 121b for discharging the airflow, the flame and the like during thermal runaway of the battery 121, thereby producing a safety protection effect. For ease of description, the end cover 121a and the members on the end cover 121a such as the electrode terminal 121b and the vent 121c are collectively referred as an end cover assembly.

As shown in FIG. 2, in the embodiment, two battery arrays 12a in the battery module 12 are stacked along the second direction z, and the batteries 121 in the battery array 12a are arranged side by side along the first direction y (i.e. the first horizontal direction in the embodiment), and the end covers 121a of all the batteries 121 in the battery module 12 face towards the same direction, namely, in one battery module 12, not only the end covers 121a of the batteries 121 in each battery array 12a face towards the same direction, but also at the same time, the end covers 121a of the batteries 121 in different battery arrays 12a also face towards the same direction. The battery module 12 has a first outer surface 12d (i.e., an upper surface) and a second outer surface 12e (i.e., a lower surface) which are located at the outermost side along the second direction z and opposite to each other. Specifically, as can be seen from FIG. 2, the battery 121 has a flat hexahedral shape, and the battery arrays 12a is stacked along the second direction z, which means that each of the battery arrays 12a is stacked on each other in such a manner that the flat planes are in contact. At this time, the first outer surface 12d and the second outer surface 12e also correspond to the flat surfaces of the battery 121 located at the outermost side along the second direction z. It can be understood that, the flat surface is a surface of the battery 121 adjacent to the end cover 121a and having a maximum area.

As can be seen, in the embodiment, the battery module 12 includes a total of 6 batteries 121 in 2 rows and 3 columns, and each of the batteries 121 is no longer vertically arranged, but is horizontally arranged, so that the battery module 12 is arranged flat, and the end covers 121a, and the electrode terminal 121b and the vent 121c on the end cover 121a of each battery 121 in the battery module 12 don't face upwards, but face towards the horizontal direction (i.e., facing towards or away from a side wall of the chamber 2a adjacent to the opening 2b). In this case, the thermal runaway product (the airflow, the flame and the like during thermal runaway) are sprayed no longer directly along the vertical direction, but first along the horizontal direction, therefore, it is favorable for relieving the harm of thermal impact to the passengers.

The batteries 121 in the battery module 12 are connected in a manner such as gluing or the like.

To further limit the battery array 12a, as illustrated by FIGS. 2 and 4, two end plates 122 are respectively disposed at both ends of the battery array 12a along the first direction y. On such basis, the two end plates 122 clamp the battery array 12a therebetween, so as to restrict the displacement of the battery array 12a, and the two end plates 122 also resist an expansion force to which the battery array 12a is inevitably subjected during charging and discharging, thereby reducing the expansion deformation of the battery array 12a during charging and discharging.

The bus bar 12c (also referred to as a Busbar or an electrical connection piece) is configured to electrically connect the batteries 121 in the battery array 12a by electrically connecting the electrode terminals 121b of each battery 121 in the battery array 12a, so as to realize a series connection, a parallel connection or a mixed connection of the batteries 121 in the battery array 12a. The battery module 12 may include a plurality of bus bars 12c, and each bus bar 12c may electrically connect the adjacent batteries 121c in the battery array 12a.

The protection member 11 is configured to prevent a flame or the like sprayed via the vent 121c, and may be made of a high-temperature-resistant and insulated material, so that the protection member 11 insulates the battery module 12 and the accommodating member 2, to avoid unnecessary short-circuit risk, and such that the protection member 11 with high temperature resistance can prevent fire without melting during the prevention of the thermal runaway product. In the embodiment, the protection member 11 is a mica plate member, i.e., the protection member 11 is made from a mica plate material, so as to satisfy the requirements of high temperature-resistance and insulation.

In addition, as shown in FIGS. 4-7, in the embodiment, the protection member 11 includes a first protection section 111, a second protection section 112, and a third protection section 113, wherein the second protection section 112 and the third protection section 113 are respectively connected to two opposite ends of the first protection section 111 along the second direction z, and both bent in a direction closer to the battery module 12 relative to the first protection section 111. In this way, the protection member 11 is U-shaped as a whole, in which the first protection section 111 forms a horizontal portion of the latter U, and the second protection section 112 and the third protection section 113 form two vertical portions of the letter U. Moreover, the second protection section 112 has a length greater than that of the third protection section 113, i.e. the two vertical portions of the letter U have different lengths. Here, the length of the second protection section 112 and the length of the third protection section 113 refer to the outwardly extending dimensions of the second protection section 112 and the third protection section 113 relative to the first protection section 111 respectively, which are respectively marked as 11 and 12 respectively in FIG. 7.

It can be known from FIGS. 2 and 5 that, the protection member 11 is disposed on the side of the battery module 12 with the end cover assembly, and the first protection section 111 thereof covers all the vents 121c of batteries 121 in the battery module 12, a portion of the second protection section 112 is covered on the first outer surface 12d, and the third protection section 113 abuts against the end cover 121a of the battery 121 corresponding to the second outer surface 12e. Moreover, in the second direction z, the lower surface of the third protection section 113 (i.e. the outer surface of the third protection section 113 in the second direction in FIG. 5, which is also the surface of the third protection section 113 away from the second protection section 112) is flush with the second outer surface 12e or higher than the second outer surface 12e (i.e. closer to the first outer surface 12d respective to the second outer surface 12e). The second protection section 112 and the first outer surface 12d may be adhered therebetween by glue or the like, so that the second protection section 112 is secured to the first outer surface 12d in a lapping joint. Moreover, the protection member 11 and the battery array 12a may be connected by the end plate 122. Specifically, in the embodiment, the first protection section 111 is connected to the end plate 122 by the rivet 14, such that the first protection section 111 is connected to the battery array 12a through the end plate 122.

Based on the above arrangement, the protection member 11 is coupled to the battery module 12 by both the second protection section 112 and the third protection section 113, therefore, compared with the circumstance that the protection member 11 is coupled to the battery module 12 only by one of the second protection section 112 and the third protection section 113, the protection member 11 and the battery module 12 in the embodiment are connected with higher strength and more stable fit relationship, which is favorable for improving the use reliability of the battery pack 100.

Moreover, based on the above arrangement, the protection member 11 can control the direction and range of thermal diffusion, not only the diffusion range of the airflow and the flame sprayed from the vent 121c during thermal runaway in the horizontal direction (specifically the third direction x) is controlled by the first protection section 111, but also the diffusion range of the airflow and the flame sprayed from the vent 121c during thermal runaway in the vertical direction is controlled under the comprehensive effect of the first protection section 111, the second protection section 112, and the third protection section 113, especially, under the effect of the second protection section 112 and the third protection section 113, it is difficult for the thermal runaway products to be sprayed above the first outer surface 12d or below the second outer surface 12e, thus, not only the damage of the thermal runaway products to the first outer surface 12d, the cover located above the first outer surface 12d, the second outer surface 12e, and the bottom plate of the accommodating member 2 located below the second outer surface 12e is reduced, but also the harm of the thermal impact to the passengers located above the battery pack 100 is effectively prevent, which are both favorable for improving the use safety of the battery pack 100 and enhancing the safety performance of the vehicle.

The third protection section 113 is configured to be shorter than the second protection section 112, and only abut against the end cover 121a of the battery 121 located at the lowermost side in the battery module 12, but not extend below the second outer surface 12e, which brings advantages as follows: on one hand, the end of the battery module 12 provided with the end cover assembly is not raised or tilted by the third protection section 113, and the battery module 12 is still in contact with the accommodating member 2 through the entire second outer surface 12e so that the battery module 12 is more stably arranged in the accommodating member 2; on the other hand, the third protection section 113 needn't occupy a vertical space, thereby the thickness of the battery pack 100 is reduced, which is favorable for realizing miniaturization of the battery pack 100 and increasing the energy density of the battery pack 100; in a further aspect, the third protection section 113 needn't carry the gravity of the battery module 12, so that the stress state of the protection member 11 is improved, the use reliability of the protection member 11 is enhanced, and the strength requirements of the protection member 11 are reduced at the same time; in still another aspect, the end cover 121a against which the third protection section 113 abuts forms a support for the protection member 11, such that the first protection section 111 is not attached to the surface on the side of the battery module 12 with the end cover assembly, but has an interval therebetween to form a passage (referred as an exhaust passage) for the thermal runaway products flowing through, so as to facilitate guiding the discharge of the thermal runaway products under the circumstance of controlling the diffusion direction and the diffusion range, and avoiding the safety problems arising from the case that it is hard and even impossible to discharge the thermal runaway product.

Figure 6:
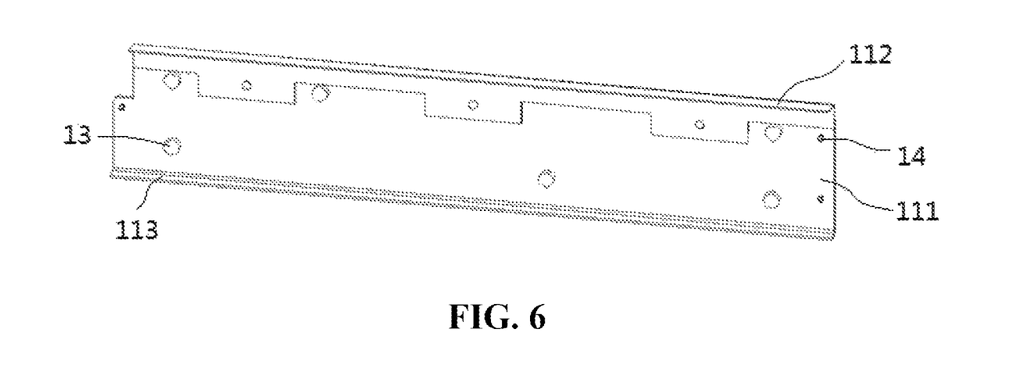
FIG. 6 shows a schematic perspective view of the protection member in FIG. 5.
Figure 7:
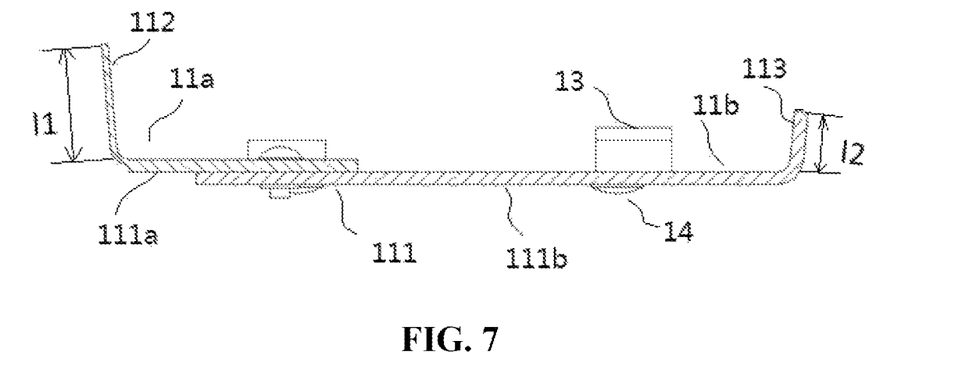
FIG. 7 shows a schematic sectional view of the protection member in FIG. 6.

Moreover, in order to further improve smooth discharge of the thermal runaway products, as shown in FIGS. 5-7, in the embodiment, the battery assembly 1 further includes a support member 13, and the support member 13 is disposed on the first protection section 111 and extending in a direction closer to the battery module 12. Specifically, the support member 13 is disposed on the first protection section 111 in a manner such as adhesion, and is located between the bus bar 12c and the first protection section 111. On such basis, the support member 13 can support the protection member 11 when the battery assembly 1 is squeezed, such that the interval between the first protection section 111 and the surface on the side of the battery module 12 with the end cover assembly will not become excessively small or even disappear due to the external effect such as squeeze, thus the exhaust passage is kept unobstructed to more reliably guide the discharge of the thermal runaway products, improving smooth discharge of the thermal runaway products. At the same time, the support member 13 is capable of withstanding the external impacts or other loads, therefor, the support member 13 can produce a cushioning effect, thereby reducing the damage suffered by the battery module 12 due to external impacts, and making the force of the battery module 12 more uniform.

The support member 13 extending in the direction close to the battery module 12 may contact or not contact the battery module 12. When the support member 13 extends in the direction close to the battery module 12 until the support member 13 contacts the battery module 12, the support member 13 is directly supported between the protection member 11 and the battery module 12, which is more favorable for maintaining a smooth exhaust passage. When the support member 13 extends in the direction close to the battery module 12 without contacting the battery module 12, the support member 13 still can come into contact with the battery module 12 due to displacement when the battery module 1 is squeezed, thereby producing a supporting effect.

In addition, the support member 13 may be made of silica gel, for example, being configured to be a silicone nail, which enhances the cushioning effect of the support member 13 on one hand, and prevents the support member 13 from scratching the battery module 12 on the other hand.

In order to improve a smooth discharge of the thermal runaway products, in the embodiment, an exhaust port is further provided between the end plate 122 and the protection member 11. Specifically, in conjunction with FIGS. 2 and 4, in the embodiment, the end plate 122 includes a base portion 122a and a connection portion 122b disposed on the base portion 122a. The base portion 122a is connected to the battery array 12a, and the connection portion 122b is connected to the protection member 11. Moreover, one end of the base portion 122a close to the protection member 11 is away from the protection member 11 relative to one end of the connection portion 122b connected to the protection member 11, in this way, there is a gap between the end of the base portion 122a close to the protection member 11 and the protection member 11. The gap then forms an exhaust port, so that the thermal runaway products can flow along the exhaust passage to the exhaust port and be discharged from the exhaust port, thereby achieving smooth discharge of the thermal runaway products, and effectively reducing the risk of the safety problems caused by the circumstance that it is hard and even impossible to discharge the thermal runaway product.

Further, in the embodiment, the first protection section 111 is not an integrated structure but a split structure. Specifically, as shown in FIGS. 5-7, the first protection section 111 of the embodiment includes a first portion 111a and a second portion 111b connected to the first portion 111a, wherein the first portion 111a is connected to the second protection section 112, and the second portion 111b is connected to the third protection section 113. On such basis, the first protection section 111 is formed by splicing the first portion 111a and the second portion 111b. Compared with the integrated structure, such spliced structure is more suitable for a brittle material property of the mica plate, and also favorable for reducing the production and machining difficulty of the protection member 11.

Moreover, as can be known from FIG. 7, in the embodiment, the first portion 111a and the second protection section 112 are integrated, such that an L-shaped first splice plate 11a is formed. Meanwhile, the second portion 111b and the third protection section 113 are integrated, such that an L-shaped second splice plate 11b is formed. With this arrangement, the protection member 11 is actually formed by splicing two L-shaped splice plates (i.e., the first splice plate 11a and the second splice plate 11b). Since the brittle mica plate is difficult to be directly machined into an U-shaped structure with two vertical portions having different lengths, but can be machined into an L-shaped structure conveniently, the configuration that the protection member 11 is formed by splicing two L-shaped splice plates can lower the machining difficulty of the protection member 11 and reduce the reject rate of the protection member 11 on the basis of satisfying the structural characteristics of the protection member 11.

In order to realize the connection between the first portion 111a and the second portion 111b, for example, the first portion 111a and the second portion 111b may be connected by fasteners such as rivets 14, or may be bonded together by structural adhesive or the like, or may be connected by fastener connection and adhesion at the same time.

To facilitate the connection between the first portion 111a and the second portion 111b, as shown in FIGS. 5 and 7, in the embodiment, the first portion 111a and the second portion 111b are not longitudinally aligned, but in the second direction Z, the lower end of the first portion 111a extends to below the upper end of the second portion 111b, namely, the end of the first portion 111a away from the second protection section 112 is close to the third protection section 113 relative to the end of the second portion 111b away from the third protection section 113, such that the first portion 111a and the second portion 111b are at least partially overlapped and lap jointed with each other in the third direction x, specifically only partially overlapped in the embodiment. Moreover, during overlapping, the first portion 111a is located at one side of the second portion 111b close to the battery module 12, in other words, the first portion 111a is located inside the second portion 111b.

Based on the above arrangement, on the one hand, the first portion 111a and the second portion 111b can be spliced conveniently, and the strength at the connection thereof is improved. On the other hand, the protection member 11 escapes the members of the battery assembly 1 located within the accommodating member 2 and above the middle of the battery module 12 in the height direction (such as a module pressing plate pressed on the battery module 12 or the like), thus facilitating the install and fixation of these members. In a further aspect, the flow area of the upper half portion of the exhaust passage is reduced, and the flow area of the lower half portion of the exhaust passage is increased, as in this way, more thermal runaway products are guide to flow downwards more rapidly, while less thermal runaway products are guide to flow upwards slowly, therefore, the smooth discharge of the thermal runaway products is ensured, at the same time, the influence of thermal runaway on the passengers above the battery assembly 1 is further reduced, and the safety and reliability of the battery pack 100 is improved.

As can be seen, in the embodiment, by arranging the battery module 12 flat in the accommodating member 2, and providing a protection member 11 in the form of a letter U with two vertical portions having different lengths on the side of the battery module 12 with an end cover assembly, the thermal shock resistance of the battery pack 100 is effectively enhanced, the use safety and reliability of the battery pack 100 is improved, and the threat of thermal runaway to the life safety of the passengers is reduced.

Further, as can be known from FIG. 1, the two battery assemblies 1 of the battery pack 100 in this embodiment are arranged side by side along the third direction represented by the coordinate axis x, and the two battery assemblies 1 don't face towards each other, but are arranged towards different directions, such that the end covers 121a in the two battery assemblies 1 face away from each other. With such arrangement, the two battery assemblies 1 are prevented from affecting each other, thus avoiding that the thermal runaway of one battery assembly 1 causes the thermal runaway of the other battery assembly 1, such that the use safety and reliability of the battery pack 100 is further improved.

Of course, in other embodiments, the number of pairs of the battery assemblies 1 in the battery pack 100 is not limited to one, but may be two or more.

The foregoing descriptions are only the exemplary embodiments of the present disclosure, but not intended to limit the present disclosure. Any modifications, equivalent substitutions, improvements and the like made within the spirit and principles of the present disclosure should all be included within the protection scope of the present disclosure.

The invention claimed is:

1. A battery assembly, comprising:
a battery module, comprising a battery array, which comprises at least two batteries arranged side by side along a first direction, wherein a vent is provided on an end cover of the battery, the end covers of all the batteries in the battery module have the same orientation, and the battery module has a first outer surface and a second outer surface opposite to each other along a second direction that is perpendicular to the first direction; and
a protection member, being configured to protect against a flame sprayed via the vent, and comprising a first protection section, a second protection section, and a third protection section, wherein the second protection section and the third protection section are respectively connected to two opposite ends of the first protection section along the second direction, and the second protection section and the third protection section are both bent in a direction closer to the battery module relative to the first protection section;
wherein the first protection section covers all the vents of batteries in the battery assembly, a part of the second protection section is covered on the first outer surface, and the third protection section abuts against the end cover of the battery corresponding to the second outer surface; and
a support member, wherein the support member is disposed on the first protection section and extends in a direction closer to the battery module.

2. The battery assembly according to claim 1, wherein the first protection section comprises a first portion and a second portion connected to the first portion, the first portion is connected to the second protection section, the second portion is connected to the third protection section, and the first portion and the second portion are separated and at least partially overlapped in a third direction that is perpendicular to the first direction and the second direction.

3. The battery assembly according to claim 2, wherein the first portion is located at one side of the second portion close to the battery module.

4. The battery assembly according to claim 2, wherein the first portion and the second protection section are integrated; and/or the second portion and the third protection section are integrated.

5. The battery assembly according to claim 1, wherein the second protection section has a length greater than that of the third protection section.

6. The battery assembly according to claim 1, wherein along the second direction, an outer surface of the third protection section is flush with the second outer surface, or an outer surface of the third protection section is close to the first outer surface relative to the second outer surface.

7. The battery assembly according to claim 1, wherein the second direction is a vertical direction.

8. The battery assembly according to claim 1, wherein the battery module further comprises a bus bar, the bus bar is electrically connected to the batteries in the battery array, and the support member is located between the bus bar and the first protection section.

9. The battery assembly according to claim 1, wherein the second protection section is adhered to the first outer surface.

10. The battery assembly according to claim 1, wherein the protection member is a mica plate.

11. The battery assembly according to claim 1, wherein the battery module comprises at least two battery arrays, which are stacked along the second direction.

12. The battery assembly according to claim 1, wherein the battery module comprises two end plates, which are respectively disposed on both ends of the battery array along the first direction, and the protection member is connected to the end plate.

13. The battery assembly according to claim 12, wherein the end plate comprises a base portion and a connection portion disposed on the base portion, the base portion is connected to the battery array, the connection portion is connected to the protection member, and there is a gap between one end of the base portion close to the protection member and the protection member.

14. A battery pack, comprising an accommodating member having a chamber inside, and the battery assembly according to claim 1, wherein the battery assembly is accommodated in the chamber.

15. The battery pack according to claim 14, comprising at least one pair of the battery modules, wherein two battery modules in the one pair of battery modules are arranged side by side along a third direction, end covers of two battery modules in the one pair of battery modules face away from each other, and the third direction is perpendicular to the first direction and the second direction.

16. A vehicle, comprising a vehicle body and the battery pack according to claim 14, wherein the battery pack is disposed on the vehicle body, and the second direction is a height direction of the vehicle body.

* * * * *